United States Patent [19]

Malfroid

[11] 3,997,509

[45] Dec. 14, 1976

[54] PHOSPHORUS-CONTAINING HALOGENATED UNSATURATED POLYESTER COMPOSITIONS

[75] Inventor: Pierre Malfroid, Jemeppe-sur-Sambre, Belgium

[73] Assignee: Solvay & Cie, Brussels, Belgium

[22] Filed: Dec. 11, 1974

[21] Appl. No.: 531,798

[30] Foreign Application Priority Data

Dec. 11, 1973 Belgium .............................. 138732

[52] U.S. Cl. ............................. 260/75 T; 260/75 P; 260/870
[51] Int. Cl.$^2$ ....................................... C08G 63/76
[58] Field of Search ............ 260/75 P, 75 EP, 75 T, 260/870

[56] References Cited

UNITED STATES PATENTS

| | | | |
|---|---|---|---|
| 2,437,232 | 3/1948 | Rothrock et al. ................ | 260/75 P |
| 2,824,085 | 2/1958 | Cummings ..................... | 260/870 X |
| 2,966,479 | 12/1960 | Fischer .......................... | 260/75 EP |
| 3,196,190 | 7/1965 | Nischk et al. ................. | 260/870 X |
| 3,278,464 | 10/1966 | Boyer et al. ..................... | 260/75 P |
| 3,361,846 | 1/1968 | Gleim et al. .................... | 260/75 P |
| 3,400,102 | 9/1968 | Ludington ........................ | 260/75 P |
| 3,525,711 | 8/1970 | Jenkner ........................... | 260/75 P |
| 3,822,325 | 7/1974 | Blaise et al. .................... | 260/75 EP |

Primary Examiner—Donald E. Czaja
Assistant Examiner—S. M. Person
Attorney, Agent, or Firm—Spencer & Kaye

[57] ABSTRACT

Phosphorus-containing halogenated unsaturated polyester compositions are prepared by heat treating halogenated unsaturated polyesters derived from at least one epihalohydrin and maleic anhydride. The heat treatment is carried out in the presence of an organic phosphite at a temperature of between 50° and 200° C.

12 Claims, No Drawings

PHOSPHORUS-CONTAINING HALOGENATED UNSATURATED POLYESTER COMPOSITIONS

BACKGROUND OF THE INVENTION

The present invention relates to phosphorus-containing halogenated unsaturated polyester compositions, manufactured from halogenated unsaturated polyesters derived from epihalohydrins.

Synthetic materials derived from unsaturated polyesters are well known to those skilled in the art. By virtue of their good mechanical properties combined with a relatively low density, there are large markets for these products in civil, aeronautical and naval engineering, these being fields where the demand for fire-resistant materials is increasing. Now, synthetic materials derived from conventional polyesters possess the major disadvantage of being inflammable and of burning readily. It has thus proved to be absolutely necessary to improve the fire-resistance of these products.

For this purpose, it has already been proposed to incorporate into them inert and unreactive flameproofing additives such as antimony oxide, chlorinated paraffins or triphenylstilbene. This technique can provide only very temporary flameproofing and leads, furthermore, to the production of heterogeneous and opaque products, the mechanical properties of which are less good.

Another known technique, which is markedly more valuable because it leads to permanent flameproofing, consists of incorporating chemically into the polyester chain as it is being formed, a difunctional flameproofing substance, for example a halogenated substance such as chlorendic acid, tetrachlorophthalic acid or anhydride, or a chlorinated polyol or its corresponding epoxy derivative. Chlorinated organic acids and anhydrides, such as chlorendic acid, are unfortunately expensive and lead, furthermore, to the production of polymers which offer little resistance to chemical agents and to the effect of light, and this greatly limits their field of application.

The use of epichlorohydrin, a readily available starting material which is much less expensive, as the flameproofing substance, was claimed in French Pat. No. 1,167,220 of 25/2/1957 in the name of Solvay & Cie. The manufacture of halogenated polyesters by non-catalytic copolymerization of epichlorohydrin and maleic anhydride is described in this patent.

In Luxembourg Patent application No. 66,454 of 10/11/1972, corresponding to copending U.S. application Ser. No. 401,806, filed on Sept. 28th, 1973, there is, furthermore, described "super-halogenated" unsaturated polyesters, that is to say polyesters which possess a halogen content higher than that of the monomers incorporated into the polyester chain, and which are also derived from an epihalohydrin. These super-halogenated unsaturated polyesters are prepared by copolymerization of maleic anhydride, used individually or as a mixture with another organic anhydride, and at least one α-epihalohydrin, in the presence of a titanium tetrahalide, the halogen being taken from the group consisting of chlorine and bromine.

The flameproof crosslinked polyester resins manufactured by employing these halogenated unsaturated polyesters derived from epihalohydrins combine good mechanical properties, comparable to those of the polymers manufactured by crosslinking conventional polyester resins, with resistance to chemical agents which is excellent compared to commercial compositions reputed to be flameproof. Their flame-resistance properties could however be improved.

SUMMARY OF THE INVENTION

It has now been found, in accordance with the present invention, that new halogenated unsaturated polyester compositions which are derived from an epihalohydrin can be manufactured which possess improved, and even optimum, flame-resistance.

The present invention relates more particularly to phosphorus-containing halogenated unsaturated polyester compositions resulting from the heat treatment of halogenated unsaturated polyesters prepared by copolymerization of at least one α-epihalohydrin and maleic anhydride, used individually or as a mixture with another organic anhydride, the sait heat treatment being carried out, in the presence of an organic phosphite, at a temperature of between 50° and 200° C.

The invention also includes the process for the manufacture of the said phosphorus-containing halogenated unsaturated polyester compositions by effecting a heat treatment, in the presence of an organic phosphite, of the said halogenated unsaturated polyesters.

DETAILED DESCRIPTION OF THE INVENTION

The halogenated unsaturated polyesters which are suitable for manufacturing the compositions according to the invention can be prepared by either catalytic or non-catalytic copolymerization of at least one α-epihalohydrin and maleic anhydride, used individually or as a mixture with another organic anhydride, the halogen being preferably chosen from the group consisting of chlorine and bromine. It is, however, preferred to use halogenated unsaturated polyesters manufactured by a catalytic method and, more particularly, those manufactured in the presence of a titanium tetrahalide in accordance with the information given in Luxembourg Patent application No. 66,454 of 10/11/1972 corresponding to copending U.S. application Ser. No. 401,806, filed on Sept. 28th, 1973. In order to manufacture these polyesters, the epihalohydrin and the anhydride or anhydrides are preferably employed in a molar ratio of between 1:1 and 2:1.

The chemical nature of the organic anhydride which can optionally be copolymerized with maleic anhydride and the epihalohydrin is not critical. This anhydride can be aliphatic, cycloaliphatic or aromatic, saturated or unsaturated, and halogenated or non-halogenated, and examples are succinic anhydride, glutaric anhydride, citraconic anhydride, itaconic anhydride, tetrahydrophthalic anhydride, methylnadic anhydride, phthalic anhydride, dichloromaleic anhydride, tetrabromophthalic anhydride and chlorendic anhydride.

An anhydride which is particularly preferred is phthalic anhydride.

The molar ratio of maleic anhydride to the other cyclic organic anhydride can vary to a certain extent. Generally, not more than one mol, and preferably not more than 0.5 mol, of the other cyclic organic anhydride is used per mol of maleic anhydride.

The present invention also includes the use of the phosphorus-containing halogenated unsaturated polyester compositions according to the invention for manufacturing polyester resins crosslinked by copolymerization, in a manner which is in itself known, with a monoethylenically unsaturated monomer.

The chemical nature of the phosphorus-containing halogenated unsaturated polyester compositions according to the invention is not known precisely. It is nevertheless certain that at least a part of the phosphorus is attached therein in the form of phosphorus-carbon bonds.

Analysis of these compositions by nuclear magnetic resonance spectrometry makes it possible to conclude that

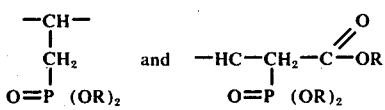

segments are probably present.

Reactions which can lead to the formation of these segments are especially:

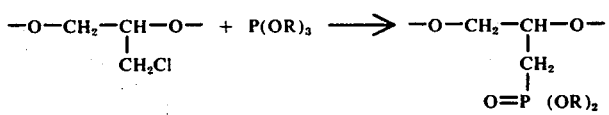

(1)

and

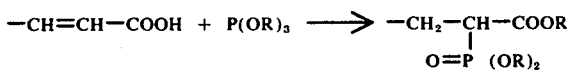

(2)

The invention is in no way limited to carrying out reactions of this type, because it is obvious that the heat treatment can also give rise to other reactions, such as isomerizations, rearrangements, substitutions and the like, which are not known to the applicant. This heat treatment simultaneously brings about the isomerization of maleic acid-type unsaturated bonds to form fumaric acid-type unsaturated bonds, insofar as the latter has not already taken place.

The choice of the organic phosphite is not particularly critical. It is however obvious that the use of phosphites with long hydrocarbon chains leads to the production of polyester compositions possessing relatively low halogen and phosphorus contents by weight, and thus relatively slight flameproofing properties.

This is why it is preferable to use organic phosphites corresponding to the general formula

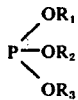

in which $R_1$, $R_2$ and $R_3$ represent $C_1$ to $C_6$, linear or branched, alkyl, haloalkyl or alkenyl radicals or a phenyl radical, and the halogen is chosen from amongst chlorine and bromine, such as trimethyl, triethyl and triallyl phosphites as well as halogenophosphites such as tris-(3-chloropropyl) and tris-(2,3-dichloropropyl) phosphites.

The invention also includes the use of mixtures of organic phosphites.

According to a particularly preferred variant of the invention, it is possible to use, as the organic phosphite, products resulting from the reaction of epichlorohydrin with phosphorus trichloride, and in particular the crude product resulting from the reaction of three mols of epichlorohydrin with one mol of phosphorus trichloride, this crude product containing a high proportion of tris-(2,3-dichloropropyl) phosphite.

The amount of organic phosphite in the presence of which the heat treatment is carried out determines the phosphorus content of the resulting polyester compositions. Because of the presence of halogen atoms in the halogenated unsaturated polyester and because of the synergistic effect of the halogen and phosphorus atoms, a heat treatment in the presence of very small amounts of organic phosphite is sufficient already substantially to improve the flameproofing properties. Thus, polyester compositions according to the invention containing of the order of 0.1% by weight of phosphorus already possess a flame-resistance which is substantially higher than that of the halogenated unsaturated polyesters from which they are derived.

The incorporation of increasing amounts of phosphorus is accompanied by a corresponding additional improvement in the flameproofing properties. However, when the phosphorus content of the polyester compositions becomes too high, more than approximately 10% by weight, their resistance to hydrolysis decreases. For this reason, and also so as not to increase the cost price of the polyester compositions according to the invention to no purpose, it is advisable to effect the heat treatment of the halogenated unsaturated polyesters in the presence of amounts of organic phosphites such that the phosphorus content of the resulting polyester compositions does not exceed 10% by weight.

The invention preferentially includes the halogenated unsaturated polyester compositions according to the invention which contain 0.5 to 5% by weight of phosphorus.

The heat treatment according to the invention is carried out by heating the homogenized mixture of unsaturated polyester and organic phosphite at a temperature of between 50° and 200° C, and preferably between 90° and 150° C. The maximum duration of the heat treatment varies, depending on the working temperature and on the nature of the organic phosphite. It has to be evaluated in each particular case by means of an orientation experiment, by measuring the period of time which passes before the composition is seen to begin to gel.

The heat treatment of the halogenated unsaturated polyesters in the presence of organic phosphites according to the invention can be carried out at the same time as or after the isomerization of the maleic acid-type unsaturated bonds to form the more reactive fumaric acid-type unsaturated bonds. It is particularly advantageous to combine these treatments. The duration of the thermal isomerization depends on the degree of isomerization or on the reactivity during copolymerization which are desired and on the chosen working temperature. It can vary approximately between a few minutes and a few hours. At 200° C, approximately twenty minutes and sufficient to achieve degrees of isomerization of the order of 90%. At 120° C, a heat treatment of approximately 15 hours is required to obtain degrees of isomerization of this order of magnitude.

The use of specific catalysts makes it possible to activate the isomerization and/or to lower the isomerization temperatures. Catalysts known to those skilled in the art are for example, halogens such as bromine and iodine, organic mono- or di-carboxylic acids and the corresponding acid chlorides such as benzenecarboxylic acid and p-toluenesulphonic acid or its chloride, and primary or secondary aliphatic amines or secondary cyclic amines such as piperidine.

When the halogenated unsaturated polyesters are thermally isomerized at a high temperature, above 200° C, it is advisable to add the organic phosphites only at the end of isomerization and after partially cooling the isomerized polyesters; the purpose of this is to eliminate any danger of premature gelling of the polyester compositions.

The variation in the degree of isomerization makes it possible to cover a very wide range of reactivities during copolymerization, and thus diverse applications. The degree of isomerization is determined in accordance with the field of application in which it is desired to employ the crosslinked polyester resins derived from the polyester compositions according to the invention. In practice, degrees of isomerization ranging from 20 to 95% make it possible to cover the entire range of reactivities of commercially available polyester resins.

The polyester resins derived from the polyester compositions according to the invention are manufactured, in a way which is in itself known, by dissolving the said compositions in a copolymerizable monoethylenically unsaturated monomer usually employed for the manufacture of unsaturated polyester resins, for example, a vinyl monomer such as styrene, an acrylic or methacrylic monomer such as acrylonitrile or methyl methacrylate, or an allyl monomer such as diallyl phthalate. Preference is however given to styrene.

It is known that the amount of crosslinking agent can vary within considerable limits. It depends especially on the nature of the crosslinking agent as well as on the chemical and physical properties desired in the final product. As a general rule, the higher is the proportion of crosslinking agent, the more flexible and less hard is the final product. The usual proportion is 20 to 50% by weight, and preferably 30 to 40% by weight, relative to the polyester. It is nevertheless possible to use higher or lower proportions, if so desired.

The resins derived from the unsaturated polyester compositions according to the invention can moreover contain various additives such as polymerization inhibitors or promoters, gelling inhibitors, stabilizers, inorganic or organic fillers such as glass fibers, pigments, dyestuffs and auxiliary flameproofing agents such as antimony and phosphorus compounds, among which antimony oxide and halogenoalkyl phosphonates may be mentioned.

The actual copolymerization or crosslinking of the unsaturated polyester resins is carried out, in a way which is in itself known, in the presence of vinyl polymerization initiators, and preferably chemical initiators of the type possessing free radicals such as benzoyl peroxide or methyl ethyl ketone peroxide.

It also lies within the scope of the present invention to use, conjointly, several unsaturated polyester compositions according to the invention, or to add other unsaturated polyesters, for example commercially available conventional polyesters, to the unsaturated polyester compositions according to the invention.

The crosslinked resins manufactured by employing the unsaturated polyester compositions according to the invention possess optimum fire-resistance properties. In particular, they possess a high oxygen index and, moreover, very good resistance to ultra-violet rays, a high heat distortion point under load and excellent wetting power for glass fibres, as well as mechanical properties comparable to, and properties of resistance to chemical agents better than, those of commercially available compositions reputed to be flameproof.

The examples which follow illustrate the invention without however limiting it.

EXAMPLES 1 to 10

Examples 1 to 10 relate to compositions according to the invention. Examples 1 to 7 relate to the manufacture of phosphorus-containing chlorinated unsaturated polyester compositions by effecting a heat treatment, in the presence of various phosphites, of a chlorinated unsaturated polyester manufactured by copolymerization at 60° C, with stirring and in an inert atmosphere, of 39 mols of epichlorohydrin and 26 mols of maleic anhydride in the presence of 1.95 mols of titanium tetrachloride. This chlorinated unsaturated polyester possesses an average molecular weight of 915, a chlorine content of 25.75% by weight, and an acid number, expressed in g of acid groups per kg, of 0.24. Example 8 relates to the manufacture of a phosphorus-containing chlorinated and brominated unsaturated polyester composition by effecting a heat treatment, in the presence of triethyl phosphite, of a chlorinated and brominated unsaturated polyester manufactured by copolymerization at 60° C, with stirring and in an inert atmosphere, of 39 mols of epichlorohydrin and 26 mols of maleic anhydride in the presence of 3.9 mols of titanium tetrabromide. This chlorinated and brominated unsaturated polyester possesses an average molecular weight of 670, a chlorine content of 18.5% by weight and a bromine content of 14% by weight, and an acid number, expressed in g of acid groups per kg, of 0.6.

Finally, Examples 9 and 10 relate to the manufacture of phosphorus-containing chlorinated and brominated unsaturated polyester compositions by effecting a heat treatment, respectively in the presence of triethyl phosphite and of the crude product resulting from the reaction of 3 mols of epichlorohydrin with 1 mol of PCl$_3$ (100° C, 6 hours, nitrogen atmosphere), of a chlorinated and brominated unsaturated polyester manufactured by the reaction, under the conditions given above, of 39 mols of epichlorohydrin and 26 mols of maleic anhydride with 1.95 mols of titanium tetrabromide. This chlorinated and brominated unsaturated polyester possesses an average molecular weight of 905, a chlorine content of 19.4% by weight and a bromine content of 8.5% by weight, and an acid number, expressed in g of acid groups per kg, of 0.23.

In each of Examples 1 to 10, 100 g of halogenated unsaturated polyester were thermally isomerized, under the temperature and duration conditions given in the attached Table I, so as to achieve a degree of isomerization of the maleic acid-type unsaturated bonds to form fumaric acid-type unsaturated bonds of 95 mol %.

After isomerization, the polyesters were partially cooled before having phosphite added to them. The temperature at which phosphite was added as well as the nature and the amount of phosphite are given in Table I. The resulting mixtures were then subjected to the heat treatment according to the invention, at temperatures lying between 95° and 180° C, depending on the particular cases. The particular conditions of the heat treatment as well as the halogen and phosphorus content of the resulting compositions according to the invention are also given in the attached Table I.

EXAMPLES 11 to 23

Examples 11 to 23 relate to crosslinked resins.

Examples 11 to 20 relate to crosslinked resins manufactured by employing the phosphorus-containing polyester compositions which are the subject of Examples 1 to 10, to which they correspond respectively.

Examples 21 to 23, reference examples, relate to crosslinked resins manufactured by employing the halogenated unsaturated polyesters derived from epichlorohydrin and maleic anhydride, used respectively in the three first series of examples, namely Examples 1 to 7, 8 and 9 to 10. Before copolymerization and crosslinking, these polyesters were subjected to a heat treatment, in the absence of organic phosphite, so as to ensure that they also were isomerized to the extent of 95 mol %.

The samples, all isomerized to the extent of 95 mol %, were mixed with styrene so as to prepare samples of resins containing 30% by weight of styrene.

In every case, 2 g of a paste containing 50% by weight of methyl ethyl ketone peroxide in dimethyl phthalate, as well as an accelerator which, depending on the particular cases, was a solution containing 1% by weight of cobalt octoate in dioctyl phthalate or a solution of a vanadium oxide of unknown concentration sold by Noury en Van der Lande N.V., under the tradename "Accelerateur VN 2", were added to 100 g of resin.

These mixtures were then cast in the form of plates which were kept for 4 hours at ambient temperature before post-curing them by heating at 100° C for 6 hours, in order to obtain very slightly coloured transparent products.

The attached Table II indicates the nature and the amount of accelerator used in each of Examples 11 to 23, as well as the flame-resistance of the crosslinked resins.

The flame-resistance was measured in accordance with the HLT 15 test of Messrs. Hooker, described by A. J. Hammerl in "The Society of the Plastics Industry, Inc. — 17th Annual Meeting of the Reinforced Plastics Division (1962)", Section 12-H, page 3.

Comparison of Examples 11 to 20 with the reference Examples 21 to 23 provides an adequate illustration that the crosslinked resins manufactured by employing the phosphorus-containing halogenated unsaturated polyester compositions which form the subject of the present invention possess a markedly improved flame-resistance relative to that of the crosslinked resins manufactured by employing the chlorinated unsaturated polyesters of the prior art.

Table 1

Phosphorus-containing halogenated unsaturated polyester compositions

| No. of the example | Isomerisation of the polyester temperature, °C | Isomerisation of the polyester duration, hours | Temperature at which (phosphite) is introduced, °C | Nature of R | Amount, g resin % | Heat treatment Temp. °C | Heat treatment Duration, hours | Cl | Br | P |
|---|---|---|---|---|---|---|---|---|---|---|
| 1 | 150 | 7.5 | 95 | methyl | 13 | 95 | 1 | 213 | 0 | 19 |
| 2 | 160 | 7.5 | 100 | ethyl | 4 | 100 | 2 | 224 | 0 | 6 |
| 3 | 160 | 7.5 | 100 | ethyl | 8.3 | 100 | 2 | 224 | 0 | 16 |
| 4 | 150 | 7.5 | 110 | ethyl | 18 | 110 | 1 | 201 | 0 | 20 |
| 5 | 160 | 7.0 | 110 | allyl | 10 | 180 | 2 | 218 | 0 | 17 |
| 6 | 150 | 7.5 | 110 | product resulting from the reaction of epichlorohydrin and PCl₃ | 12 | 110 | 1 | 270 | 0 | 9 |
| 7 | 150 | 7.5 | 110 | product resulting from the reaction of epichlorohydrin and PCl₃ | 24.5 | 110 | 1 | 292 | 0 | 13 |
| 8 | 150 | 7.5 | 110 | ethyl | 6.3 | 110 | 1 | 177 | 131 | 10 |
| 9 | 150 | 7.5 | 110 | ethyl | 4 | 110 | 1 | 183 | 80 | 5 |
| 10 | 150 | 7.5 | 110 | product resulting from the reaction of epichlorohydrin and PCl₃ | 6.3 | 110 | 0.5 | 215 | 64 | 7 |

Table II

Crosslinked polyester resins

Crosslinking of the resins containing 30% of styrene

Flameproofing properties of the crosslinked resins

| No. of the example | Accelerator Nature | Accelerator Amount* | Flame-resistance, HLT 15 test |
|---|---|---|---|
| 11 | V oxide | 1 | 84 |
| 12 | " | " | 20 |
| 13 | " | " | 24 |
| 14 | " | " | 44 |
| 15 | " | " | 100 |
| 16 | " | " | 76 |
| 17 | " | " | 100 |
| 18 | Co octoate | 0.25 | 100 |
| 19 | V oxide | 1 | 100 |
| 20 | " | " | 100 |
| 21 (R) | Co octoate | 0.5 | 0 |
| 22 (R) | " | " | 52 |

Table II-continued

| | Crosslinked polyester resins | | |
|---|---|---|---|
| No. of the example | Crosslinking of the resins containing 30% of styrene | | Flameproofing properties of the crosslinked resins |
| | Accelerator Nature | Amount* | Flame-resistance, HLT 15 test |
| 23 (R) | " | " | 20 |

*The amounts of accelerator used are expressed in g of solution per 100 g of resin.

I claim:

1. A phosphorus-containing halogenated unsaturated polyester composition resulting from the heat treatment of a halogenated unsaturated polyester prepared by copolymerization in the presence of a titanium tetrahalide of at least one α-epihalohydrin and maleic anhydride, used individually or as a mixture with another organic anhydride, the halogen of the polyester being selected from the group consisting of chlorine, bromine, and mixtures thereof, the said heat treatment being carried out, in the presence of an organic phosphite, at a temperature of between 50° and 200° C, said organic phosphite corresponding to the general formula

in which $R_1$, $R_2$ and $R_3$ represent $C_1$ to $C_6$ linear or branched, alkyl, haloalkyl or alkenyl radicals, or a phenyl radical.

2. The phosphorus-containing halogenated unsaturated polyester composition according to claim 1 wherein $R_1$, $R_2$ and $R_3$ represent the 2,3-dichloropropyl radical.

3. The phosphorus-containing halogenated unsaturated polyester composition according to claim 1 which contains 0.1 to 10% by weight of phosphorus.

4. The phosphorus-containing halogenated unsaturated polyester composition according to claim 3 which contains 0.5 to 5% by weight of phosphorus.

5. The phosphorus-containing halogenated unsaturated polyester composition according to claim 1 wherein the heat treatment is carried out at a temperature of between 90° and 150° C.

6. A process for the manufacture of a phosphorus-containing halogenated unsaturated polyester composition comprising heat treating a halogenated unsaturated polyester prepared by copolymerization in the presence of a titanium tetrahalide of at least one α-epihalohydrin and maleic anhydride, used individually or as a mixture with another organic anhydride, the halogen of the polyester being selected from the group consisting of chlorine, bromine, and mixtures thereof, said heat treatment being carried out in the presence of an organic phosphite, at a temperature of between 50° and 200° C, said organic phosphite corresponding to the general formula

in which $R_1$, $R_2$ and $R_3$ represent $C_1$ to $C_6$ linear or branched, alkyl, haloalkyl or alkenyl radicals, or a phenyl radical.

7. The process according to claim 6 wherein $R_1$, $R_2$ and $R_3$ represent the 2,3-dichloropropyl radical.

8. The process according to claim 6 wherein sufficient organic phosphite is used to provide a polyester which contains 0.1 to 10% by weight of phosphorus.

9. The process according to claim 6 wherein sufficient organic phosphite is used to provide a polyester which contains 0.5 to 5% by weight of phosphorus.

10. The process according to claim 6 wherein the heat treatment is carried out at a temperature of between 90° and 150° C.

11. A process for the manufacture of a cross-linked polyester resin comprising crosslinking a phosphorus-containing halogenated unsaturated polyester composition according to claim 1 with a copolymerizable monoethylenically unsaturated monomer.

12. A cross-linked polyester resin manufactured by copolymerizing at least one phosphorus-containing halogenated unsaturated polyester composition according to claim 1 with a copolymerizable monoethylenically unsaturated monomer.

* * * * *